(12) United States Patent
Sridhara et al.

(10) Patent No.: US 11,556,881 B2
(45) Date of Patent: Jan. 17, 2023

(54) GENERATION OF BUSINESS PROCESS MODEL

(71) Applicant: International Business Machines Corporation, Armonk, NY (US)

(72) Inventors: Giriprasad Sridhara, Bangalore (IN); Neelamadhav Gantayat, Hebbal (IN); Sampath Dechu, Hyderabad (IN); Gargi Banerjee Dasgupta, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 939 days.

(21) Appl. No.: 16/392,377

(22) Filed: Apr. 23, 2019

(65) Prior Publication Data
US 2020/0342369 A1    Oct. 29, 2020

(51) Int. Cl.
| | |
|---|---|
| *G06F 40/30* | (2020.01) |
| *G06Q 10/06* | (2012.01) |
| *G06T 7/60* | (2017.01) |
| *G10L 15/22* | (2006.01) |
| *G10L 15/18* | (2013.01) |
| *G06V 20/40* | (2022.01) |

(52) U.S. Cl.
CPC .......... *G06Q 10/067* (2013.01); *G06F 40/30* (2020.01); *G06T 7/60* (2013.01); *G10L 15/1822* (2013.01); *G10L 15/22* (2013.01); *G06V 20/40* (2022.01); *G06V 20/44* (2022.01)

(58) Field of Classification Search
CPC .......................... G06Q 10/067; G06F 16/9024
USPC ................................. 705/348; 716/55, 132
See application file for complete search history.

(56) References Cited

U.S. PATENT DOCUMENTS

| | | | |
|---|---|---|---|
| 8,352,909 B2 | 1/2013 | Aggarwal et al. | |
| 8,510,699 B1 * | 8/2013 | Acar | G06F 9/455 |
| | | | 716/132 |
| 2011/0283244 A1 * | 11/2011 | Abdo | G03F 7/705 |
| | | | 716/55 |

(Continued)

FOREIGN PATENT DOCUMENTS

| | | | | |
|---|---|---|---|---|
| JP | 0202686 A2 * | 11/1986 | ......... | G06F 16/9024 |
| JP | 2018170009 A | 11/2018 | | |

OTHER PUBLICATIONS

Fabian Friedrich et al., "Process Model Generation from Natural Language Text", Jun. 2011, 16 pages, ResearchGate.

*Primary Examiner* — Ruay Ho
(74) *Attorney, Agent, or Firm* — Ference & Associates LLC (57) ABSTRACT

One embodiment provides a method, including: obtaining at least one video capturing images of a writing capture device used during a business process design session, wherein the images comprise portions of the process flow; obtaining at least one audio recording corresponding to the business process design session; identifying an intended business process model shape; determining at least one business process model shape missing from the process flow provided on the writing capture device; identifying a task dependency for pairs of business process model shapes; and generating a business process model from (i) the intended business process model shapes, (ii) the at least one business process model shape missing from the process flow, and (iii) the identified task dependencies.

20 Claims, 4 Drawing Sheets

(56) References Cited

U.S. PATENT DOCUMENTS

| | | |
|---|---|---|
| 2011/0320240 A1 | 12/2011 | Flores et al. |
| 2012/0066662 A1 | 3/2012 | Chao et al. |
| 2017/0316387 A1 | 11/2017 | Joshi et al. |
| 2019/0244348 A1* | 8/2019 | Buckler .................. G06N 20/00 |
| 2020/0320175 A1* | 10/2020 | Roberts .................. G06T 19/20 |

* cited by examiner

GENERATION OF BUSINESS PROCESS MODEL

BACKGROUND

Business processes are employed by entities and people. Generally a business process is any type of process that has more than one step. In other words, a business process can range from something as simple as a process for tying a shoe to something as complicated as a process for building a skyscraper. Many of these business processes are defined by a process flow that identifies the steps that are to be performed, an order of the steps to be performed, any entity that is responsible for a particular step, and the like. This process flow, and, thereby, the business process, may be graphically represented using a process flow diagram (e.g., business process model, unified modeling language activity diagram, etc.) that uses different shapes for representing different types of tasks or steps (e.g., rectangles for performing tasks, diamonds for decision tasks, etc.), edges for connecting the shapes to delineate a connection between tasks, edges with arrows to designate a temporal order of the tasks, swimlanes that designate responsible entities, and the like.

BRIEF SUMMARY

In summary, one aspect of the invention provides a method for automatically generating a business process model representing a process flow having a plurality of steps for performing a business process, the business process model being a graphical representation of the process flow and including geometrical shapes representing tasks of the process flow and edges representing a temporal ordering of the tasks of the process flow, the method comprising: obtaining at least one video capturing images of a writing capture device used during a business process design session, wherein the images comprise portions of the process flow, the process flow being represented by geometrical shapes corresponding to business process model shapes and provided on the writing capture device; obtaining at least one audio recording corresponding to the business process design session; identifying, for each of the geometrical shapes provided on the writing capture device and obtained from the at least one video, an intended business process model shape, wherein the intended business process model shape comprises a standard business process model shape corresponding to an intended function of the provided geometrical shape; determining at least one business process model shape missing from the process flow provided on the writing capture device; identifying a task dependency for pairs of business process model shapes, wherein the identifying a task dependency comprises determining one of the business process model shapes from the pair temporally occurring, within the process flow, before the other of the business process model shapes from the pair; and generating a business process model from (i) the intended business process model shapes, (ii) the at least one business process model shape missing from the process flow, and (iii) the identified task dependencies.

Another aspect of the invention provides an apparatus for automatically generating a business process model representing a process flow having a plurality of steps for performing a business process, the business process model being a graphical representation of the process flow and including geometrical shapes representing tasks of the process flow and edges representing a temporal ordering of the tasks of the process flow, the apparatus comprising: at least one processor; and a computer readable storage medium having computer readable program code embodied therewith and executable by the at least one processor, the computer readable program code comprising: computer readable program code configured to obtain at least one video capturing images of a writing capture device used during a business process design session, wherein the images comprise portions of the process flow, the process flow being represented by geometrical shapes corresponding to business process model shapes and provided on the writing capture device; computer readable program code configured to obtain at least one audio recording corresponding to the business process design session; computer readable program code configured to identify, for each of the geometrical shapes provided on the writing capture device and obtained from the at least one video, an intended business process model shape, wherein the intended business process model shape comprises a standard business process model shape corresponding to an intended function of the provided geometrical shape; computer readable program code configured to determine at least one business process model shape missing from the process flow provided on the writing capture device; computer readable program code configured to identify a task dependency for pairs of business process model shapes, wherein the identifying a task dependency comprises determining one of the business process model shapes from the pair temporally occurring, within the process flow, before the other of the business process model shapes from the pair; and computer readable program code configured to generate a business process model from (i) the intended business process model shapes, (ii) the at least one business process model shape missing from the process flow, and (iii) the identified task dependencies.

An additional aspect of the invention provides a computer program product for automatically generating a business process model representing a process flow having a plurality of steps for performing a business process, the business process model being a graphical representation of the process flow and including geometrical shapes representing tasks of the process flow and edges representing a temporal ordering of the tasks of the process flow, the computer program product comprising: a computer readable storage medium having computer readable program code embodied therewith, the computer readable program code executable by a processor and comprising: computer readable program code configured to obtain at least one video capturing images of a writing capture device used during a business process design session, wherein the images comprise portions of the process flow, the process flow being represented by geometrical shapes corresponding to business process model shapes and provided on the writing capture device; computer readable program code configured to obtain at least one audio recording corresponding to the business process design session; computer readable program code configured to identify, for each of the geometrical shapes provided on the writing capture device and obtained from the at least one video, an intended business process model shape, wherein the intended business process model shape comprises a standard business process model shape corresponding to an intended function of the provided geometrical shape; computer readable program code configured to determine at least one business process model shape missing from the process flow provided on the writing capture device; computer readable program code configured to identify a task dependency for pairs of business process model shapes, wherein the identifying a task dependency comprises determining one of the business process model shapes from the pair temporally occurring, within the process flow, before the other of the business process model shapes from the pair; and computer readable program code configured to generate a business process model from (i) the intended business process model shapes, (ii) the at least one business process model shape missing from the process flow, and (iii) the identified task dependencies.

A further aspect of the invention provides a method, comprising: automatically generating a business process model from (i) at least one obtained video recording of a business process model design session and (ii) at least one obtained audio recording of the business process model design session, wherein the generated business process model graphically represents, as geometrical shapes and edges, a process flow for a business process that was a subject of the business process model design session; the automatically generating comprising: identifying, from the at least one obtained video recording, tasks of the process flow graphically represented and recorded during the business process model design session; determining a business process model shape for each of the identified tasks, wherein the determining comprises (i) parsing a portion of the audio recording corresponding to audio regarding the identified task, (ii) identifying a business process function of the task, and (iii) mapping the identified business process function to a business process model shape; identifying, from the at least one obtained audio recording, at least one business process model shape not graphically represented during the business process model design session; determining a business process model shape for each of the at least one business process model shapes not graphically represented; identifying a direction for edges connecting pairs of the business process model shapes, wherein the identifying a direction comprises determining a dependency of tasks within the process flow; and graphically representing the process flow using the (i) determined business process model shape for each of the identified tasks, (ii) the determined business process model shapes for each of the at least one business process model shapes not graphically represented, and (iii) the identified direction of edges connecting pairs of the business process model shapes.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

Process flow diagrams, for example, business process models, are typically very complicated. Therefore, to generate the process flow diagram, or graphical representation of a process flow, entities employ teams of people that assist in the creation of the business process model. For ease of readability a business process model will be referred to herein. However, it should be understood that the systems and methods as described herein can be applied to any process flow diagram, for example, a business process model, a unified modeling language activity diagram, or any other type of process flow diagram that utilizes shapes and edges for representing tasks or steps within a process flow. Generally the teams responsible for the creation of the business process model work together during one or more business process model design sessions. The design sessions are used to brainstorm the tasks that are necessary for performance of the process, identify task dependencies, identify entities responsible for performing different tasks, and the like.

During the design sessions one or more members of the team typically records the ideas on a writing capture device, for example, a whiteboard, a smartboard, a computer application that allows for handwriting input, multiple pieces of paper, or the like. Generally the information that is captured on the writing capture device does not include many of the details that are discussed during the session. Rather, the information that is captured generally represents a high-level overview of the process. The details are usually discussed among the team, but these details are generally not captured. Additionally, as a team member captures the information the team member generally does not analyze the information to the point of capturing accurate business model shapes. For example, while the task that is being discussed is a decision task, which would be represented by a diamond shape using traditional business process model notation (BPMN) nomenclature, the person capturing the information on the writing capture device may simply draw a rectangle, which would represent a standard task or step using traditional nomenclature. Thus, the information that is captured is generally lacking details or missing information, often has incorrect shapes, and does not identify all possible task paths.

Traditionally, in order to generate the business process model from the design session information, a person, for example, one of the team members, takes the information identified within the design session, for example, any information that is written down or otherwise recorded, and attempts to generate the business process model from this information. The generation of the business process model requires the person to understand the information being presented during the design session and also have an understanding of proper BPMN nomenclature so that the process flow can be accurately represented within the business process model. The manual generation of the business process model is a time-consuming endeavor. Additionally, the team member tasked with the generation of the business process model must fill in the details that are missing from the captured information and needs to identify the correct shapes that should be used for representing particular tasks or steps. In order to fill in the missing details and identify the correct shapes, the team member either must have access to an audio recording of the design session so that information that was discussed but not captured can be identified or talk with one of the process flow designers. This results in additional effort and time consumption for the person creating the business process model, but also for the designers of the process flow.

Accordingly, an embodiment provides a system and method for automatically generating a business process model from at least one video and at least one audio recording of a business process design session. The business process design session may be a session where a team of people brainstorm and discuss a business process. A business process may be any type of process that may be defined using a process map, business process model, or procedure steps. The business process may be defined by a process flow that identifies the different steps for performing the business process, the temporal ordering of the steps, steps requiring input from other steps, users responsible for particular steps, and any other parameters required for proper performance of the business process. The system obtains both a video recording and an audio recording of the design session. Through analysis of the video and corresponding portions of the audio, the system identifies tasks or steps of the process flow. For example, the system may identify tasks that were recorded on a writing capture medium (e.g., whiteboard, smartboard, handwriting input application, papers, etc.) from the video. Using corresponding portions of the audio, the system can determine what business process model shape, also referred to as geometrical shapes, should be used to represent the task within the business process model. For example, a rectangle would represent a task with an input and an output, whereas a diamond shape would represent a decision task having at least two separate output paths.

Additionally, from an analysis of the video and audio recordings the system can determine if any business process model shapes are missing from the process flow. In other words, the system can identify if a task, or other process flow element that would be represented by a business process model shape, was discussed but never recorded on the writing capture medium. The system also identifies dependencies between tasks that are connected by an edge. From the identification of the dependencies, the system can add edges between task pairs and also provide an arrow delineating the direction or temporal ordering of the tasks. The system can also analyze the audio recording to identify entities or people responsible for certain tasks to create swimlanes in the business process model. Once the correct shapes are identified, missing shapes are determined, task dependencies are identified, and responsible entities are identified, the system can automatically generate the graphical representation of the process flow, where the graphical representation uses the correct shapes and nomenclature and identifies the correct temporal ordering of the tasks within the process flow.

Such a system provides a technical improvement over current systems for generating business process models. Rather than requiring the tedious and time-consuming process of manual creation of business process models, the described system and method provide a technique for the automatic generation of the business process model. The system is able to analyze video and audio recordings from a design session to identify the business process shapes, task dependencies, and responsible entities for each task within the business process model. Since the system is able to identify this information from the video and audio recordings, the system does not require a team member to manually create the business process model. Additionally, since a team member does not have to manually create the business process model, it is not necessary to have a team member that has knowledge of both the process flow and business process model notation. Additionally, the team members that are involved in the actual design of the process flow do not have to be involved in the generation of the business process model. Thus, the described system and method provide a technique that is quicker and requires less manual intervention than the traditional process for generation of business process models.

Figure 1:
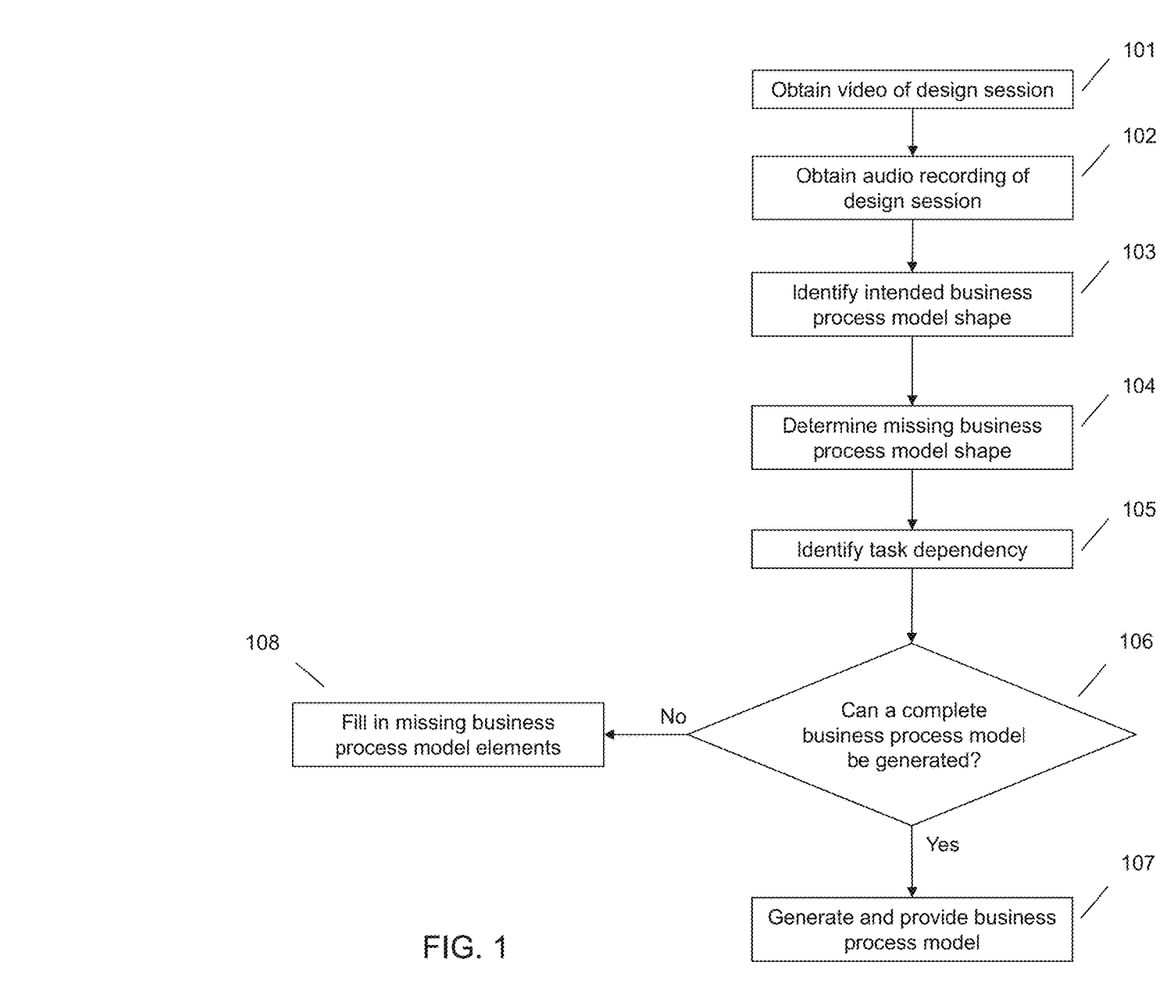
FIG. 1 illustrates a method of automatically generating a business process model from at least one video and at least one audio recording of a business process design session.

FIG. 1 illustrates a method for automatically generating a business process model from at least one video and at least one audio recording of a business process design session. A business process may be any type of process that may be defined using a process map, business process model, or procedure steps. For example, a business process may be related to a service provided by an entity. For example, a business process may be related to loan approvals, vehicle registrations, invoice processing, infrastructure or building planning, scheduling, or the like. As another example, a business process may be related to a method or steps that are carried out by an entity (e.g., user, corporation, etc.). For example, a business process may be related to steps for withdrawing money from an automated teller machine (ATM), the steps required for hiring a new employee, or the like. The business process may be defined by a process flow that identifies the different steps for performing the business process, the temporal ordering of the steps, steps requiring input from other steps, users responsible for particular steps, and any other parameters required for proper performance of the business process.

At 101 the system may obtain at least one video recording of the design session. For example, while the team members are in the design session, one or more cameras may be recording the design session. From these cameras, the system can obtain one or more videos of the design session. Obtaining the video may include a user uploading the video to the system, the system accessing a database or other data storage location storing the video, a user providing a location identifier that indicates the location of the video to the system, or the like. The video(s) may include images that represent portions of the process flow for the business process. These portions of the process flow may have been captured on a writing capture device (e.g., whiteboard, papers, smartboard, handwriting input application, etc.) that was used by the team members during the design session. For example, as the team members brainstorm or provide ideas regarding the process flow, one or more of the team members may physically record some of the portions of the process flow, for example, by writing or drawing on a whiteboard. These recorded portions of the process flow may be represented by geometrical shapes, or business process model shapes, that represent different task types within the business process. Generally the captured information does not represent the entirety of the process flow and, rather, represents a high-level overview of the process flow. Nonetheless, the information that is recorded on a writing capture device is also captured on the video recording of the design session. Therefore, images within the video may show what was captured on the writing capture device.

At 102 the system may obtain at least one audio recording of the design session. Obtaining the audio recording may include a user uploading the audio recording to the system, the system accessing a database or other data storage location storing the audio recording, a user providing a location identifier that indicates the location of the audio recording to the system, or the like. While the team members are in the design session, one or more audio recordings of the session may be captured. For example, the room may have an audio recording device, a team member may use a handheld audio recording device, an information handling device (e.g., smartphone, laptop computer, tablet, etc.) may have an application that can capture audio recordings, or the like, that allows for capture of audio provided during the design session. The audio recording may therefore capture information that is not physically recorded on the writing capture device. For example, the team members may talk about details of the process flow that are not recorded on the writing capture device. This audio recording may then be provided to or accessed by the system.

At 103 the system may identify an intended business process model shape for each of the tasks within the process flow. While the design team may have provided shapes and task identifications on the writing capture device, the design team may not have put much thought into determining the correct business process model nomenclature to use to represent the task. For example, the correct business process model nomenclature or shape for a process task or atomic activity is a rectangle, whereas the correct business process model nomenclature or shape for a decision/gateway is a diamond. However, while the design team is capturing the process flow, the design team may simply draw everything as rectangles on the writing capture device without regard to what the proper nomenclature or shape should be. Accordingly, the system identifies, for each of the business process model shapes that are provided on the writing capture device and recorded within the video, what the correct or intended business process shape is. The intended business process model shape is the standard business process model shape that corresponds to an intended function of the captured business process model shape. In other words, the system determines what function (e.g., task, subroutine, decision, event, gateway, etc.) the team intended to capture with the shape that was provided on the writing capture device.

To determine an intended business process model shape, the system first has to identify the business process model shapes that were provided on the writing capture device. Therefore, the system segments the video recording(s) into different frames. Specifically, the system needs to determine when a business process model shape has been completed on the writing capture device. Conventional frame segmentation techniques are not effective in creating these segmentations. Conventional frame segmentation techniques segment either at frames of the video or when an abrupt change in the scene occurs. If the system relies on single frame segmentation, then the analysis of the video would require large amounts of processing resources which is unnecessary. Segmenting by abrupt changes in scenes may result in no segmentations at all or segments occurring when each line is drawn on the writing capture device.

Accordingly, the system segments the video by grouping frames of the video that correspond to a complete business process model shape. In other words, the system monitors the video frames and identifies when a user starts a business process model shape and marks that frame as a starting frame. The system then identifies the frame corresponding to when that business process model shape is complete and marks that frame as an ending frame. The system then groups all of the frames between the marked frames, including the start frame and the end frame, into a single video segmentation. In order to identify what frames to mark as starting and ending frames, the system applies a deep-learning business process model notation shape classifier to each contour that is provided by the user. In other words, as the user draws a line, the system determines whether the addition of the line results in a shape that matches a standard business model shape.

Figure 2:
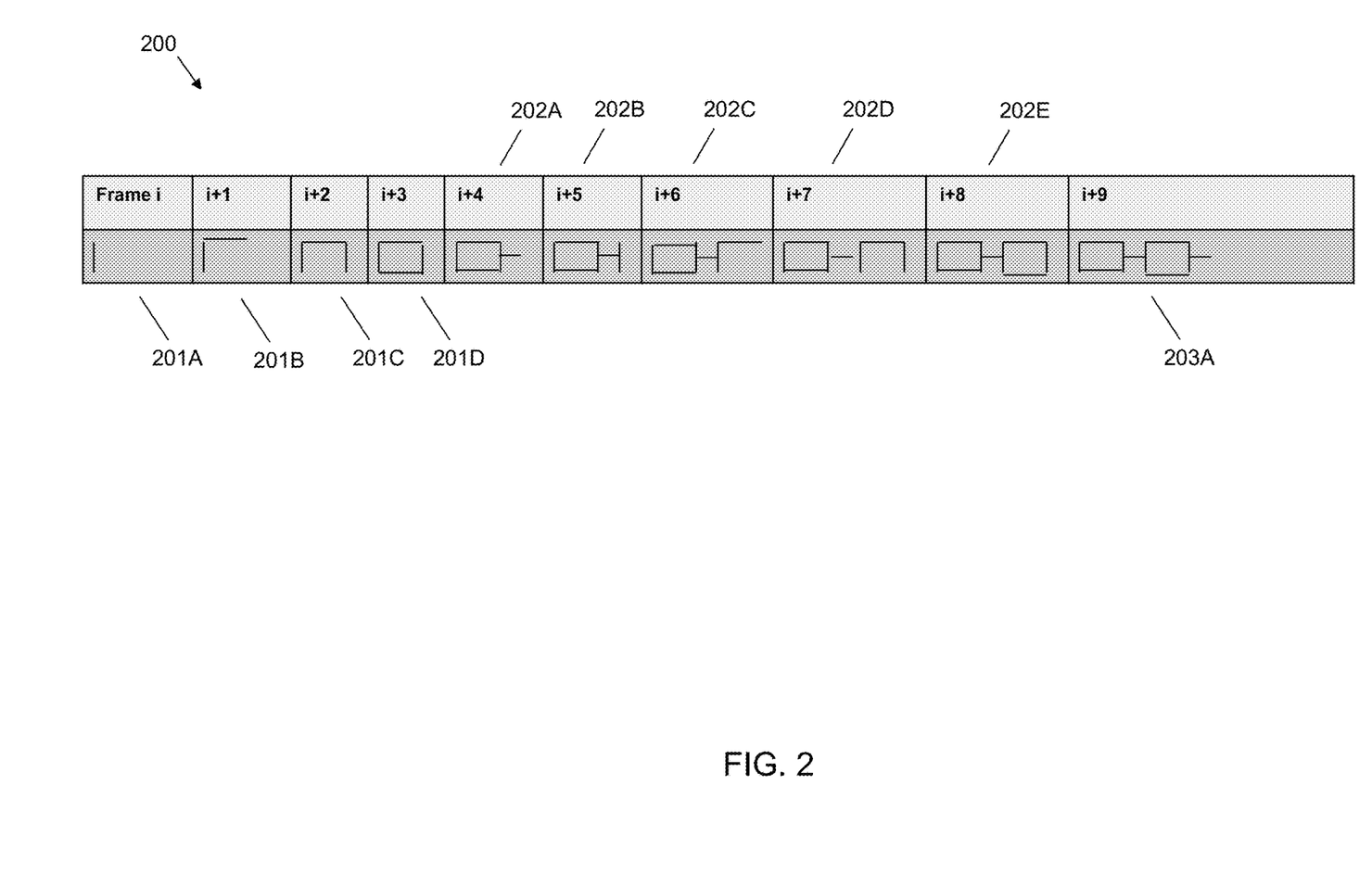
FIG. 2 illustrates an example of video segmentation for business process model shape identification.

FIG. 2 illustrates an example of this video segmentation technique. The top row indicates the frame count and the bottom row illustrates the line or contour provided by the user within the corresponding frame. In frame i 201A, the user has provided a single vertical line. The system, using the classifier, would identify this contour or line and compare it to a database of standard business process model shapes to determine if it matches one of the standard shapes. In this case, it does not match a standard shape. The system would then move to the next frame and so on until a standard shape was identified in the user provided input. In the example of FIG. 2, this occurs at frame i+3. Thus, since the contours of this frame match a standard business process model shape, in this example, a rectangle, the system would mark frame i+3 as the end frame of the segment. Accordingly, the system would group frames 201A, 201B, 201C, and 201D into a single segment. This process continues and, in the example of FIG. 2, would result in another segment grouping of frames 202A, 202B, 202C, 202D, and 202E. Frame 203A would then be the start of the next grouping. In other words, the system uses the deep-learning BPMN shape classifier for each contour and whenever the number of identified shapes increases by one, the system marks the frame of the video as an end frame and groups all frames between marked frames, including the starting frame and the ending frame, into a single video segment.

Once the system has segmented the video into different groups that represent a single business process model shape, the system has to determine what the intended function of the drawn or provided business process model shape is. In other words, the system identifies whether the provided shape is the correct shape or should be converted to a different shape based upon the function that the shape is supposed to convey. To determine the function that the business process model shape that was captured on the writing capture device was intended to cover, the system may analyze the audio recording. The system may identify the location in or portion of the audio recording that corresponds to a discussion of the provided shape of interest. To identify the location the system may utilize timestamps on both the video and the audio to correlate different portions of the audio to the video. In other words, since a task was likely discussed at the same time or close to the same time that it was drawn or provided to the writing capture device, the system can identify a timestamp corresponding to the video portion where the shape was drawn and then locate a corresponding timestamp in the audio recording. The system may also use audio, natural language processing, and character recognition techniques to find correlations between the audio and the video. For example, the system may parse the audio and identify words within the audio that match words that are provided in the text on the writing capture device as identified from the video. The system may then determine that the portion of the audio having those words is correlated with or corresponds to the identified portion of the video having those same words.

Once the corresponding portion of the audio recording is identified, the system can parse the audio recording, for example, using natural language processing techniques, to identify the intended function of the provided business process model shape. Once the system has parsed the audio, the system may identify what one or more users stated and compare these phrases to different templates corresponding to standard business process model shapes. For example, if the user states "this task could have two outputs," the system can identify a standard business process shape that has a template that allows two outputs, for example, the decision/gateway shape. Each standard business process shape can have multiple templates. For example, the decision/gateway shape may have multiple audio templates, for example, a template corresponding to a discussion of two outputs, a template corresponding to a discussion of alternate outputs, a template corresponding to an either/or statement, a template corresponding to divergence of paths, or the like. Thus, the system maps the utterance provided by a team member to a template of a standard business process model shapes, and, thereby, identifies the intended business process model shape, thereby identifying the intended function.

At 104 the system determines whether any business process model shapes are missing from the process flow that was recorded on the video. If the system determines that shapes are missing, the system may identify what shapes are missing and fill in the shapes. To determine whether and what business process model shapes are missing from the process flow, the system may parse and analyze the audio recording, using any of the techniques discussed herein, and identify a portion of the audio recording that includes a discussion of a business process model shape or function that is not included on the writing capture device. For example, if the design team is discussing two shapes that are drawn on the board but indicates that these tasks could be performed in parallel, the system may identify that these tasks are parallel tasks and a parallel gateway shape should be included between the two tasks even though the parallel gateway shape was not include on the writing capture device.

Identifying what missing shape to include may include performing some of the same functions that were discussed during the explanation of 103. For example, the system can identify an intended function from the audio recording and then determine a business process model shape, from the standard business process shapes, that corresponds to the intended function. This shape can then be added to or included in the business process model generation. In other words, the system may map utterances or audio provided by the design team to shape templates and identify a corresponding shape template. Then, if this shape is not included on the writing capture device, the system can add this missing shape into the process flow.

At 105 the system may identify dependencies between tasks that are either provided on the writing capture device and/or identified from the audio recording. In other words, the system can identify task dependencies for both tasks that were captured on the writing capture device and tasks that were discussed in the audio recording, but not captured on the writing capture device. Identifying dependencies includes identifying pairs of business process model shapes of the process flow that should be connected. It should be understood that each business process model shape can be connected to more than one other business process model shape. However, there will only be a single connector, also referred to as an edge, between the same two business process model shapes. Not only does the system need to identify which business process model shapes should be connected by an edge, but it also needs to identify which task of the pair temporally occurs before the other task in the pair. Thus, the system determines which task of the pair depends on the other task of the pair. In other words, the system determines which task of the pair needs to temporally occur before the other task of the pair can be completed. In standard business process model notation, some tasks, while connected, may not be dependent on the other connected task. Thus, some edges do not include directional arrows, the designation of dependency. In the case that the system determines that there is not a dependency between the two tasks, the system may simply provide an edge connector with no directional arrow.

The task dependencies identify what direction the directional arrow should point between two pairs of tasks. In other words, the task dependencies identify which task of the pair should be identified as the starting task of the pair and which task should be identified as the ending task of the pair. The simplest technique for determining task dependencies is to mine existing process texts to infer edge direction. In other words, if the tasks are similar to tasks used in other process flows, the system can identify how the dependencies were represented in the other process flows and use this information for representing the dependencies in the current process flow. Identifying similar process flows may include using a similarity distance technique to determine how similar text within a task box of the current process flow is to text provided in the task box of the similar process flow.

In the case that mining existing process texts does not work, for example, a similar process flow does not exist, similar tasks could not be identified, or the like, the system can determine task dependencies by analyzing the video recording. The system can identify frames of the video that correspond to a pair of business process model shapes. Identifying the frames may include using the video segmentation technique as described in connection with FIG. 2. Using frame analysis the system can determine which shape of the pair was drawn first in the video. In other words, the system can temporally order the frames and determine which business process shape was temporally drawn first in the video. The system can then infer that the shape drawn first is the starting shape of the pair, and the shape drawn second is the dependent or ending shape of the pair. Similarly, rather than identifying which shape was drawn first, if the user provided an edge or connecting line between the shapes, the system can identify from which shape of the pair the user started the line. In other words, because a user would typically draw a line between shapes starting at the starting shape, based upon which shape the line was started at, the system can infer that this shape is the starting shape and the other shape is the dependent shape. Accordingly, the system can use spatial and temporal analysis to identify task dependencies from the video.

Additionally, or alternatively, task dependencies may be determined from an analysis of the audio recording. For example, during the design session one team member may indicate that a task depends from another task even though that information is not captured on the writing capture device. As another example, generally one task that depends from another task will be discussed after a discussion of the previous task. Accordingly, by determining which task was discussed first in the audio recording, the system can infer that this task is the starting task, with the other task that was discussed subsequently being inferred to be the ending task. Thus, from an analysis of the audio, the system can identify task dependencies.

At 106 the system may determine whether a business process model can be generated from the intended business process model shapes, the identified missing business process model shapes, and the identified task dependencies. If a complete business process model cannot be generated at 106, the system may attempt to fill in the missing process model elements by returning to any of the previous steps at 108. Alternatively, the system can generate the incomplete business process model and identify, or otherwise, indicate which portions need to be filled-in or addressed by a user.

If, however, the system determines that a complete business process model can be generated at 106, the system may generate and provide the business process model to a user at 107. As should be understood, the generation of the business process model is an automatic generation of the business process model that did not require human intervention to identify intended business process model shapes, a designation of shapes that should be included that were missing, and/or an identification of task dependencies. Rather, the system can determine all of this information from the video and/or audio recordings of the design session that were obtained at 101 and 102. The generation of the business process model may include providing the correct shapes for tasks within the process flow, providing shapes for any tasks that were not recorded on the writing capture device, and identifying the direction of tasks, or task dependencies.

Additionally, traditional business process model graphical representations may include swimlanes. Swimlanes include groupings of tasks by responsible entities or user. For example, all the tasks that are to be performed by a project manager would be grouped in a swimlane that corresponds to the project manager. Tasks to be performed by an engineer would be grouped into a different swimlane that corresponds to the engineer. In order to determine the swimlane grouping, the system may identify the person responsible for each of the tasks within the business process model. To identify the responsible person, the system may analyze the audio recording portion that corresponds to the task. Using natural language processing techniques, for example, semantic analysis, syntactic analysis, parts-of-speech taggers, or the like, the system can identify the subject of a sentence or utterance provided by a user referring to the responsible actor. Once the subject has been identified, the system can use the subject as a swimlane participant.

In generating the business process model, the system may need to add details regarding how exceptions are handled. For example, if a process or sub-routine within the process flow does not occur how it was intended to occur (e.g., an exception occurs), the exception handling identifies what steps are carried out to rectify or address this exception. Generally exception handling may not be recorded on the writing capture device. Rather, exceptions and how the exception should be handled or addressed would be discussed by the design team. Therefore, the system can analyze the audio recording to identify exceptions and how the exception should be handled or treated. This information can then be provided in the generated business process model.

Figure 3:
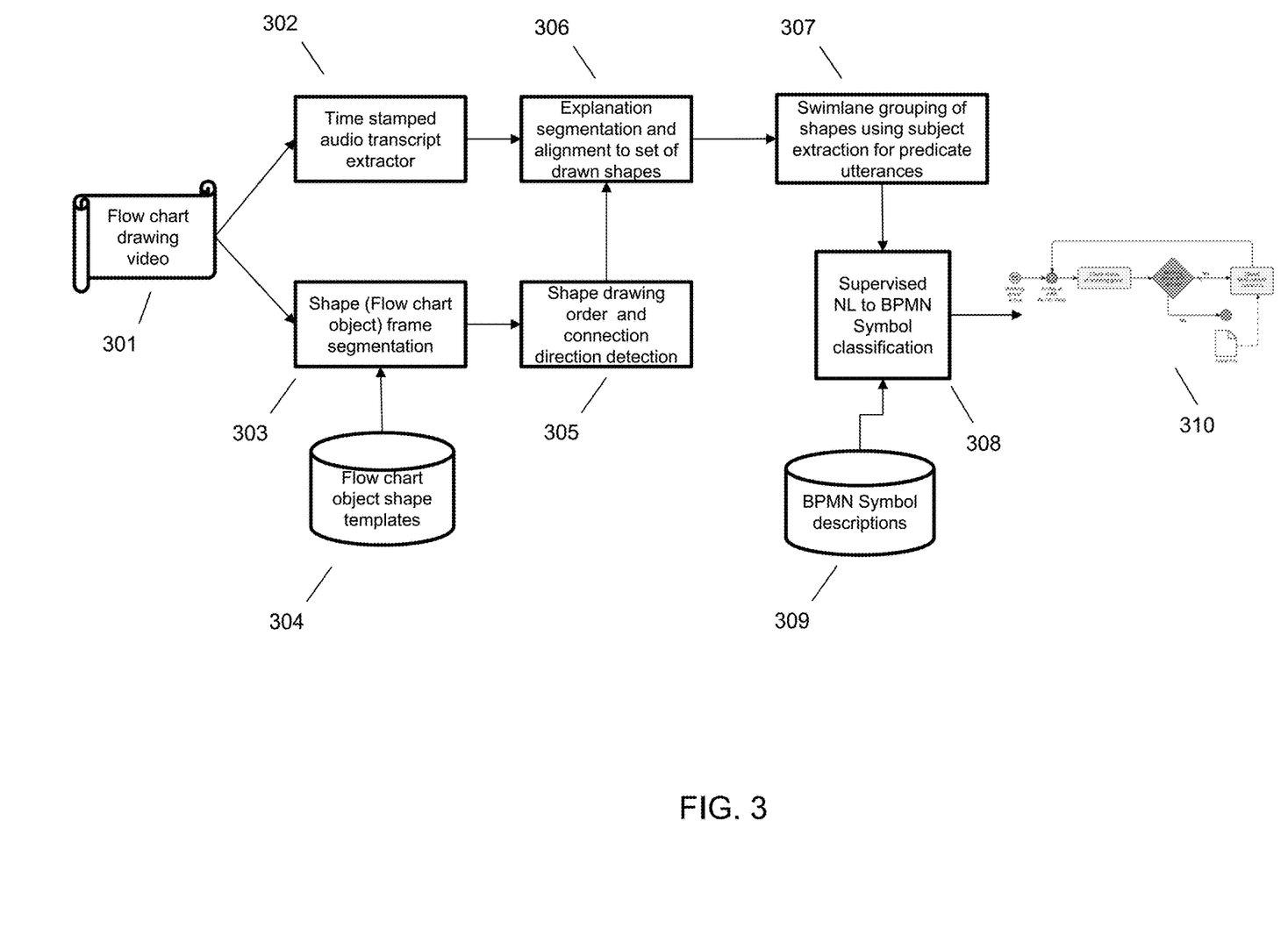
FIG. 3 illustrates an example system architecture for automatically generating a business process model from at least one video and at least one audio recording of a business process design session.

FIG. 3 represents an overall architecture and flow of the described system and method. The system receives, or otherwise obtains, a video 301 that includes a flow chart drawing or other images of the process flow that were recorded by the team members on a writing capture device during a design session. The system also obtains an audio recording of the design session. The audio recording is sent to an extractor 302 that can generate a time stamped audio transcript. From the video the system can identify the correct business process model shapes that represent each task within the business process flow. Identification of the correct shapes includes segmenting the video into different groups of frames 303, where each group of frames includes a complete business process model shape. Identifying when the frames should be grouped includes accessing a database include flow chart object shape templates 304. The flow chart object shape templates allow the system to identify when contours presented in the video can be correlated to or represent business process model shapes. From the video the system can identify the drawing order of the shapes and, therefore, identify the correct direction of connection of the edges 305.

The system can then identify missing shapes based upon the audio recording by segmenting the audio and aligning the audio with a set of drawn shapes 306. From the audio the system can identify the entity or user responsible for a particular task, for example, by identifying a responsible party using audio extraction techniques. This identification allows the system to create swimlanes representing each responsible person and grouping the tasks corresponding to that person into the swimlanes 307. The system can then create the business process model 310. The created business process model includes the correct shapes, shapes representing information that was missing from the recorded process flow, correct edges having directional connectors connecting the tasks, and swimlane groupings of the tasks.

Thus, the described systems and methods represent a technical improvement over current systems for generation of a graphical representation of a process flow. The described system does not require a team member to manually generate the graphical representation, for example, a business process model, thereby reducing the need for many hours of manual intervention. Additionally, since a team member does not have to manually generate the graphical representation, there is no need for a team member who understands both the process flow being represented and the correct nomenclature for accurately graphically representing the process flow. Thus, the described system and method provide a technique that reduces the number of hours required for generation of the graphical representation and also reduces the amount of manual intervention and human hours that are involved in graphically representing the process flow. For example, from the design session the system can automatically generate the graphical representation, so the process flow designers only have to provide the information once instead of having to communicate the information to a graphical representation developer.

Figure 4:
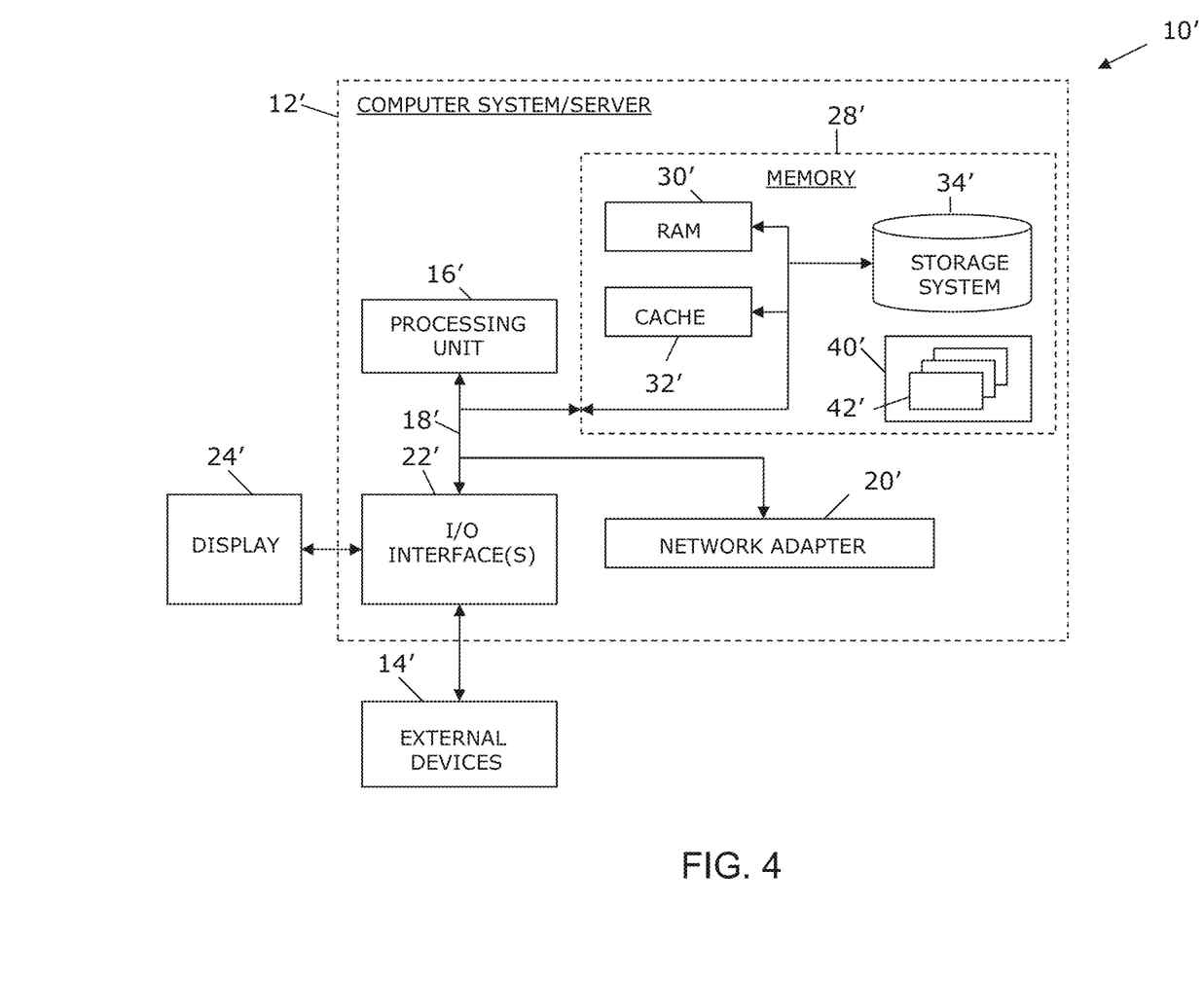
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for automatically generating a business process model representing a process flow having a plurality of steps for performing a business process, the business process model being a graphical representation of the process flow and including geometrical shapes representing tasks of the process flow and edges representing a temporal ordering of the tasks of the process flow, the method comprising:

obtaining, using at least one processor, at least one video capturing images of a writing capture device used during a business process design session, wherein the images comprise portions of the process flow, the process flow being represented by geometrical shapes corresponding to business process model shapes and provided on the writing capture device;

obtaining, using the at least one processor, at least one audio recording corresponding to the business process design session;

identifying, using the at least one processor, for each of the geometrical shapes provided on the writing capture device and obtained from the at least one video, an intended business process model shape, wherein the intended business process model shape comprises a standard business process model shape corresponding to an intended function of the provided geometrical shape;

determining, using the at least one processor, at least one business process model shape missing from the process flow provided on the writing capture device;

identifying, using the at least one processor, a task dependency for pairs of business process model shapes, wherein the identifying a task dependency comprises determining one of the business process model shapes from the pair temporally occurring, within the process flow, before the other of the business process model shapes from the pair; and generating, using the at least one processor, a business process model from (i) the intended business process model shapes, (ii) the at least one business process model shape missing from the process flow, and (iii) the identified task dependencies.

2. The method of claim 1, wherein the intended function of the geometrical shape is determined by (i) identifying a portion of the audio recording related to a discussion of one of the plurality of geometrical shapes and (ii) parsing the portion to identify the intended function.

3. The method of claim 2, wherein the function is determined by comparing the portion to a template corresponding to possible business process model shapes.

4. The method of claim 1, wherein the determining comprises (i) parsing the audio recording and (ii) identifying a portion of the audio recording discussing a business process model shape not included on the writing capture device.

5. The method of claim 1, comprising (i) identifying a responsible person for each of a plurality of tasks within the process flow and (ii) wherein the generated business process model includes an identification of the responsible person corresponding to the shapes of the business process model.

6. The method of claim 5, wherein the identifying a responsible person comprises employing a natural language analysis technique on a portion of the audio recording corresponding to each of the plurality of tasks.

7. The method of claim 1, wherein the identifying a task dependency comprises (i) identifying frames of the at least one video corresponding to the pair of business process model shapes and (ii) determining, from a temporal ordering of the identified frames, which one of the business process model shapes of the pair that a user started an edge connecting to the other of the business process model shapes of the pair.

8. The method of claim 1, wherein the identifying an intended business process model shape comprises segmenting the at least one video into groups of frames by (i) determining when lines provided by a user on the writing capture medium corresponds to a business process model shape, (ii) marking the at least one video as a segment when the provided lines correspond to a business process model shape, and (iii) grouping frames of the at least one video occurring between marked segments.

9. The method of claim 8, wherein the determining comprises using a deep-learning business process model shape classifier to determine if the lines provided map to a business process model shape.

10. The method of claim 1, comprises identifying, from the at least one audio recording, exception handling within the process flow; and
wherein the generated process model includes the exception handling.

11. An apparatus for automatically generating a business process model representing a process flow having a plurality of steps for performing a business process, the business process model being a graphical representation of the process flow and including geometrical shapes representing tasks of the process flow and edges representing a temporal ordering of the tasks of the process flow, the apparatus comprising:

at least one processor; and
a computer readable storage medium having computer readable program code embodied therewith and executable by the at least one processor, the computer readable program code comprising:

computer readable program code configured to obtain at least one video capturing images of a writing capture device used during a business process design session, wherein the images comprise portions of the process flow, the process flow being represented by geometrical shapes corresponding to business process model shapes and provided on the writing capture device;

computer readable program code configured to obtain at least one audio recording corresponding to the business process design session;

computer readable program code configured to identify, for each of the geometrical shapes provided on the writing capture device and obtained from the at least one video, an intended business process model shape, wherein the intended business process model shape comprises a standard business process model shape corresponding to an intended function of the provided geometrical shape;

computer readable program code configured to determine at least one business process model shape missing from the process flow provided on the writing capture device;

computer readable program code configured to identify a task dependency for pairs of business process model shapes, wherein the identifying a task dependency comprises determining one of the business process model shapes from the pair temporally occurring, within the process flow, before the other of the business process model shapes from the pair; and computer readable program code configured to generate a business process model from (i) the intended business process model shapes, (ii) the at least one business process model shape missing from the process flow, and (iii) the identified task dependencies.

12. A computer program product for automatically generating a business process model representing a process flow having a plurality of steps for performing a business process, the business process model being a graphical representation of the process flow and including geometrical shapes representing tasks of the process flow and edges representing a temporal ordering of the tasks of the process flow, the computer program product comprising:

a computer readable storage medium having computer readable program code embodied therewith, the computer readable program code executable by a processor and comprising:

computer readable program code configured to obtain at least one video capturing images of a writing capture device used during a business process design session, wherein the images comprise portions of the process flow, the process flow being represented by geometrical shapes corresponding to business process model shapes and provided on the writing capture device;

computer readable program code configured to obtain at least one audio recording corresponding to the business process design session;

computer readable program code configured to identify, for each of the geometrical shapes provided on the writing capture device and obtained from the at least one video, an intended business process model shape, wherein the intended business process model shape comprises a standard business process model shape corresponding to an intended function of the provided geometrical shape;

computer readable program code configured to determine at least one business process model shape missing from the process flow provided on the writing capture device;

computer readable program code configured to identify a task dependency for pairs of business process model shapes, wherein the identifying a task dependency comprises determining one of the business process model shapes from the pair temporally occurring, within the process flow, before the other of the business process model shapes from the pair; and computer readable program code configured to generate a business process model from (i) the intended business process model shapes, (ii) the at least one business process model shape missing from the process flow, and (iii) the identified task dependencies.

13. The computer program product of claim 12, wherein the intended function of the geometrical shape is determined by (i) identifying a portion of the audio recording related to a discussion of one of the plurality of geometrical shapes and (ii) parsing the portion to identify the intended function.

14. The computer program product of claim 12, wherein the determining comprises (i) parsing the audio recording and (ii) identifying a portion of the audio recording discussing a business process model shape not included on the writing capture device.

15. The computer program product of claim 12, comprising (i) identifying a responsible person for each of a plurality of tasks within the process flow and (ii) wherein the generated business process model includes an identification of the responsible person corresponding to the shapes of the business process model.

16. The computer program product of claim 15, wherein the identifying a responsible person comprises employing a natural language analysis technique on a portion of the audio recording corresponding to each of the plurality of tasks.

17. The computer program product of claim 12, wherein the identifying a task dependency comprises (i) identifying frames of the at least one video corresponding to the pair of business process model shapes and (ii) determining, from a temporal ordering of the identified frames, which one of the business process model shapes of the pair that a user started an edge connecting to the other of the business process model shapes of the pair.

18. The computer program product of claim 12, wherein the identifying an intended business process model shape comprises segmenting the at least one video into groups of frames by (i) determining when lines provided by a user on the writing capture medium corresponds to a business process model shape, (ii) marking the at least one video as a segment when the provided lines correspond to a business process model shape, and (iii) grouping frames of the at least one video occurring between marked segments.

19. The computer program product of claim 12, comprises identifying, from the at least one audio recording, exception handling within the process flow; and wherein the generated process model includes the exception handling.

20. A method, comprising:

automatically, using at least one processor, generating a business process model from (i) at least one obtained video recording of a business process model design session and (ii) at least one obtained audio recording of the business process model design session, wherein the generated business process model graphically represents, as geometrical shapes and edges, a process flow for a business process that was a subject of the business process model design session;

the automatically generating comprising:

identifying, using the at least one processor, from the at least one obtained video recording, tasks of the process flow graphically represented and recorded during the business process model design session;

determining, using the at least one processor, a business process model shape for each of the identified tasks, wherein the determining comprises (i) parsing a portion of the audio recording corresponding to audio regarding the identified task, (ii) identifying a business process function of the task, and (iii) mapping the identified business process function to a business process model shape;

identifying, using the at least one processor, from the at least one obtained audio recording, at least one business process model shape not graphically represented during the business process model design session;

determining, using the at least one processor, a business process model shape for each of the at least one business process model shapes not graphically represented;

identifying, using the at least one processor, a direction for edges connecting pairs of the business process model shapes, wherein the identifying a direction comprises determining a dependency of tasks within the process flow; and graphically representing, using the at least one processor, the process flow using the (i) determined business process model shape for each of the identified tasks, (ii) the determined business process model shapes for each of the at least one business process model shapes not graphically represented, and (iii) the identified direction of edges connecting pairs of the business process model shapes.

* * * * *